US007484949B2

(12) United States Patent
Hinc et al.

(10) Patent No.: US 7,484,949 B2
(45) Date of Patent: Feb. 3, 2009

(54) CONTINUOUS IMPREGNATION OF LONG FIBERS WITH RESIN FOR MANUFACTURING ELONGATE COMPOSITE ELEMENTS

(75) Inventors: Henri Hinc, Saint-Beauzire (FR); Jean-Paul Meraldi, Zurich (CH); Antoine Virdis, Grolley (CH); Fernand Genoud, Remaufens (CH)

(73) Assignee: Conception Et Developpement Michelin S.A., Givisiez (CH)

( * ) Notice: Subject to any disclaimer, the term of this patent is extended or adjusted under 35 U.S.C. 154(b) by 250 days.

(21) Appl. No.: 11/069,027

(22) Filed: Feb. 28, 2005

(65) Prior Publication Data

US 2005/0173823 A1 Aug. 11, 2005

Related U.S. Application Data

(63) Continuation of application No. 09/907,284, filed on Jul. 17, 2001, now Pat. No. 6,926,853.

(30) Foreign Application Priority Data

Jul. 17, 2000 (FR) .................................. 00 09369

(51) Int. Cl.
*B29C 47/88* (2006.01)
(52) U.S. Cl. ..................................... 425/114; 425/174.4
(58) Field of Classification Search ................. 425/114, 425/131.1, 174.4, 462
See application file for complete search history.

(56) References Cited

U.S. PATENT DOCUMENTS 3,516,465 A 6/1970 Guyot
3,608,606 A 9/1971 Marzocchi
3,646,186 A * 2/1972 Hager .................... 264/171.13
3,682,217 A 8/1972 Marzocchi
3,730,678 A 5/1973 Wedler et al.
3,853,605 A 12/1974 Fahey
3,918,506 A 11/1975 Marzocchi
4,065,340 A 12/1977 Dickerson
4,092,443 A 5/1978 Green
4,216,856 A 8/1980 Moring (Continued)

FOREIGN PATENT DOCUMENTS

EP 0 475 745 3/1992

(Continued)

OTHER PUBLICATIONS

Platt et al.., "The continuous flow cleaning line", Textile Research Journal, 1959, 29, pp. 727-732.

(Continued)

*Primary Examiner*—Robert B Davis
*Assistant Examiner*—Joseph Leyson
(74) *Attorney, Agent, or Firm*—Cohen Pontani Lieberman & Pavane LLP

(57) ABSTRACT

An apparatus for manufacturing an elongate composite element in undefined lengths, the composite element containing reinforcement fibers embedded in a matrix based on a composition containing a curable resin, including a vacuum chamber, rigid-walled inlet tubing, an impregnation chamber, rigid-walled transfer tubing between the vacuum chamber and the impregnation chamber, a sizing die and, downstream of the sizing die, irradiation tubes providing radiation in the ultraviolet-visible spectrum to prepolymerize the resin.

32 Claims, 5 Drawing Sheets

U.S. PATENT DOCUMENTS

| | | | |
|---|---|---|---|
| 4,233,396 A | 11/1980 | Armstrong et al. | |
| 4,462,855 A | 7/1984 | Yankowsky et al. | |
| 4,506,717 A | 3/1985 | Thise-Fourgon | |
| 4,664,859 A | 5/1987 | Knoop | |
| 4,666,954 A | 5/1987 | Forgo et al. | |
| 4,734,144 A | 3/1988 | Markow | |
| 4,859,380 A | 8/1989 | Ogata | |
| 4,891,179 A | 1/1990 | Peacock et al. | |
| 4,892,764 A | 1/1990 | Drain et al. | |
| 4,894,190 A | 1/1990 | Kromrey | |
| 4,957,422 A * | 9/1990 | Glemet et al. | 425/114 |
| 5,098,496 A | 3/1992 | Breitigam et al. | |
| 5,122,547 A | 6/1992 | Becker et al. | |
| 5,145,621 A | 9/1992 | Pratt | |
| 5,151,142 A | 9/1992 | Imai | |
| 5,246,051 A | 9/1993 | Inada | |
| 5,266,139 A | 11/1993 | Yokota et al. | |
| 5,291,930 A | 3/1994 | Kikuchi et al. | |
| 5,302,661 A | 4/1994 | Bastiaansen | |
| 5,427,165 A | 6/1995 | Balestra et al. | |
| 5,439,353 A | 8/1995 | Cook et al. | |
| 5,486,378 A * | 1/1996 | Oestreich et al. | 427/163.2 |
| 5,492,755 A | 2/1996 | Binse et al. | |
| 5,609,806 A | 3/1997 | Walsh et al. | |
| 5,658,519 A | 8/1997 | March et al. | |
| 5,700,417 A | 12/1997 | Fernyhough et al. | |
| 6,007,917 A | 12/1999 | Weigel et al. | |
| 6,046,267 A | 4/2000 | Vidaurre | |
| 6,068,916 A | 5/2000 | Takeuchi | |
| 6,099,123 A | 8/2000 | Engardio et al. | |
| 6,117,258 A | 9/2000 | Spragg et al. | |
| 6,143,219 A | 11/2000 | Vidaurre et al. | |
| 6,248,450 B1 | 6/2001 | Voss et al. | |
| 6,625,365 B2 * | 9/2003 | Yamano et al. | 385/128 |

FOREIGN PATENT DOCUMENTS

| | | |
|---|---|---|
| EP | 0 542 709 A1 | 5/1993 |
| GB | 1 080 562 | 8/1967 |
| GB | 1 522 441 | 8/1978 |
| GB | 1 546 764 | 5/1979 |
| JP | 63134310 | 6/1998 |
| WO | WO 92/12018 | 7/1992 |

OTHER PUBLICATIONS

Platt et al., "Mechanics of Elastic Performance of Textile Materials", Textile Research Journal, Aug. 1959, pp. 611-627.

* cited by examiner

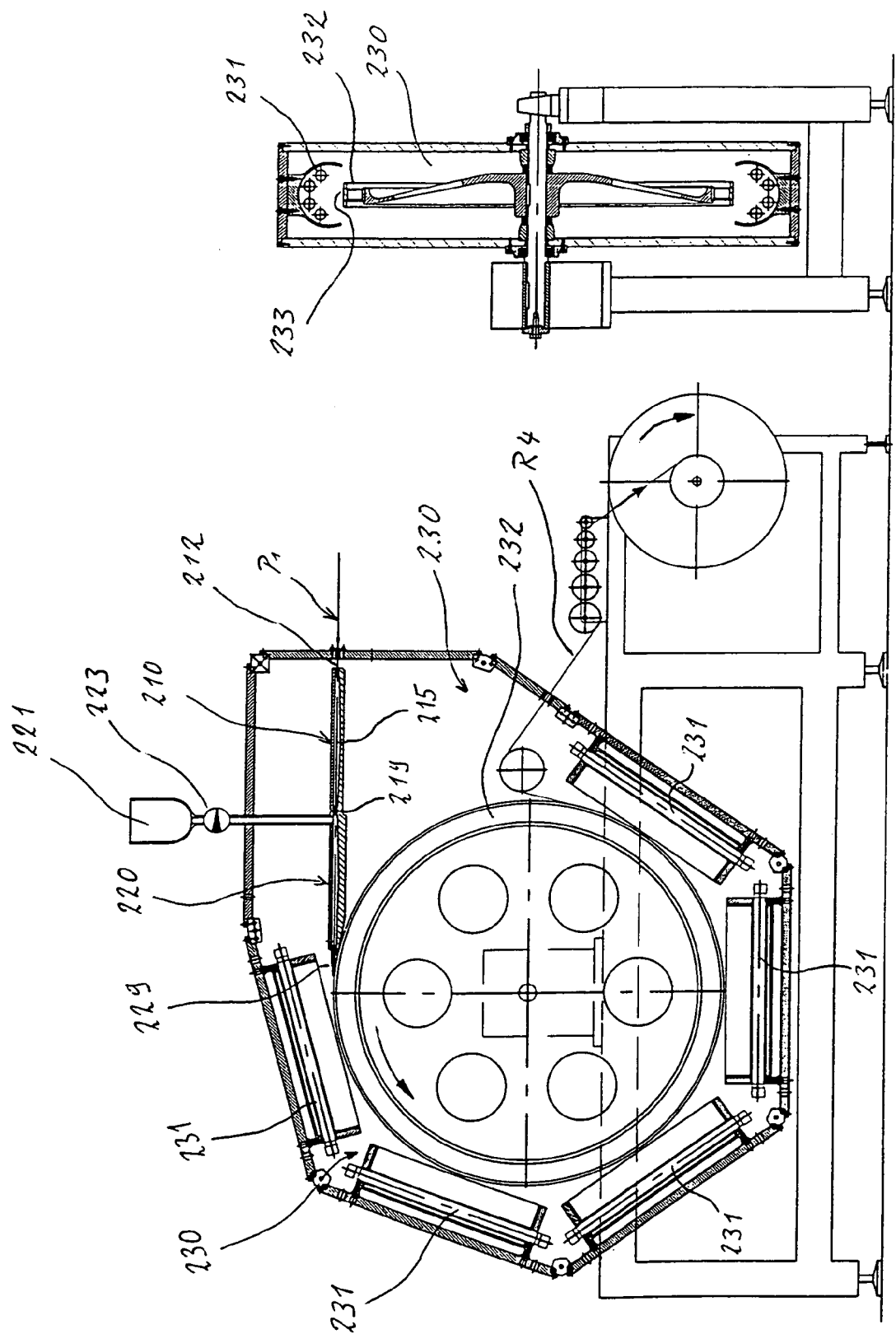

CONTINUOUS IMPREGNATION OF LONG FIBERS WITH RESIN FOR MANUFACTURING ELONGATE COMPOSITE ELEMENTS

CROSS-REFERENCE TO RELATED APPLICATION

This application is a continuation of U.S. application Ser. No. 09/907,284 filed Jul. 17, 2001, and issued as U.S. Pat. No. 6,926,853 on Aug. 9, 2005.

BACKGROUND OF THE INVENTION

The present invention relates to the manufacture of a long elongate composite element, comprising long reinforcement fibers, embedded in a matrix of cured resin.

It is becoming more and more common to use composite materials for manufacturing structural components or load-bearing components or reinforcement elements, owing to the ever better performance which may be achieved with composite materials. Composite materials often allow considerable weight savings to be made while achieving equivalent mechanical performance. Moreover, in applications where the composite material is subject to considerable stress, it is very important to be able to benefit fully from the reinforcing action of the fibers. This requires absolute mastery of the manufacture of composite elements.

The role of the resin is to connect the fibers firmly to one another and to transmit stresses to the fibers. It is very important for the fibers to be totally impregnated and distributed homogeneously and in accordance with the desired level of reinforcement over the entire cross section of the composite element.

One of the known methods of manufacturing composite components with good mechanical qualities is known as "pultrusion". This entails continuously unwinding the reinforcing fibers and dipping them in a resin bath to ensure that the fibers are impregnated with the resin. Then, all the fibers and impregnating resin are drawn through a heated die, in order to effect at least partial polymerization of the resin. In this way, it is possible continuously to draw products with a cross section dictated by the shape of the die. Unfortunately, pultrusion does not readily lend itself to high speed operation, as impregnation tends to be slow and difficult. Furthermore, the kinetics of the heat transfer phenomenon considerably limits the rate of manufacture.

Another known possibility consists in disposing the reinforcement fibers as desired in a mold, producing a vacuum and finally impregnating the fibers with the resin. The vacuum allows very effective impregnation. This method lends itself well to the manufacture of components of moderate finite dimensions, as a mold is used which corresponds to the shape and dimensions of the manufactured component. However, when it comes to the continuous manufacture of long components, it is not easy to impregnate the fibers correctly. And the more it is wished to accelerate production rates the more difficult it becomes to ensure perfect impregnation of the fibers with the resin.

Furthermore, the increasing commercial popularity of composite materials also depends on their cost price. It is therefore very important to be able to propose technological means capable of high manufacturing rates under the most competitive economic conditions possible.

SUMMARY OF THE INVENTION

One object of the invention is to achieve the fullest possible impregnation of the fibers in a manner which is compatible with very high manufacturing rates. Another object is to arrive at this result in a manner which is compatible with continuous manufacture.

These and other objects are attained in accordance with one aspect of the present invention directed to a process for the continuous preparation of a long elongate composite element, containing reinforcement fibers embedded in a matrix based on a composition comprising resin curable by a radiation in the ultraviolet-visible spectrum, wherein reinforcement fibers are formed into an arrangement which is conveyed so as to subject it, successively and in a feed direction, to the following operations. The arrangement of fibers is degassed by the action of a vacuum in a first processing chamber. The arrangement of fibers is impregnated with the composition in a second processing chamber to obtain a pre-preg containing the fibers and the composition while keeping the arrangement substantially out of contact with the atmosphere. The pre-preg is passed through a die having a cross section of predetermined area and shape, to provide the pre-preg with a predetermined shape. Downstream of the die, the shape of the pre-preg is stabilized by at least partial polymerization of the pre-preg resin.

It should be noted that the fibers are called "long" because the length is not limited by constraints resulting from the production process, which latter may be described as continuous. According to a significant aspect of the present invention and in contrast to conventional pultrusion, the sizing die does not play any role in polymerization of the resin.

Preferably, the stabilization stage continues until said composition forms a solid medium (stage known as the gelling stage or therebeyond), so that the product is sufficiently cohesive to be capable of subsequent handling, for example to be capable of undergoing other treatments or of being used as an intermediate product incorporated into an end product, with the mechanical stresses which that entails, without the risk of "wringing" of the fibers, during which the amount of resin in the preform would diminish in an uncontrolled manner. The aim of stabilization is thus preferably to achieve a minimum level of polymerization allowing the prevention of any outflow of resin upon subsequent treatment thereof (in effect, treatment of the composite or of the item into which it is incorporated) under the action of heat, or even of pressure. The aim of stabilization is also preferably to achieve a minimum level of polymerization allowing the stabilized pre-preg to be provided with resistance to buckling of its fibers under subsequent bending stress.

Said composition advantageously comprises a resin curable by ionizing radiation and the stabilization stage is performed by means of a suitable treatment, for example by ionizing radiation. As suitable ionizing radiation, it is proposed to use ultraviolet-visible radiation in the spectrum ranging from 300 nm to 450 nm or a beam of accelerated electrons. Initiating polymerization by ionizing radiation not only allows the achievement of a stabilized impregnated state but also allows the process of polymerization to be stopped by ceasing emission of said radiation. In effect, the aim of stabilization is also not to exceed a maximum level of polymerization, allowing subsequent adhesion of the stabilized pre-preg, for example to itself or to rubber.

It is possible to select a composition comprising a resin curable by a peroxide, the stabilization stage being performed by means of a heat supply, for example by the action of microwaves. It is also possible to select a composition comprising a resin curable by ionizing radiation, stabilization stage polymerization being initiated and controlled by means of an ionizing treatment. The latter variant is of more particular relevance, since it opens up the way to various methods of liquefying the resin, so as to facilitate impregnation of the arrangement of fibers.

Thus, according to another aspect, the invention proposes a process for the continuous preparation of a long elongate composite element comprising reinforcement fibers embedded in a matrix based on a composition comprising a resin curable by ionizing radiation, comprising the following stages:

arranging reinforcement fibers and conveying this arrangement so as to subject it, successively and in the feed direction, to the following operations, while keeping said arrangement out of contact with the atmosphere;

impregnating said arrangement of fibers with said composition to obtain a pre-preg containing the fibers and the composition;

passing said pre-preg through a die having a cross section of predetermined area and shape, to provide said pre-preg with a predetermined shape;

downstream of the die, stabilizing the shape of the pre-preg by at least partial polymerization of the pre-preg resin, said at least partial polymerization being initiated and controlled by ionizing radiation.

It is of course also possible to improve the efficacy of the impregnation by degassing the arrangement of fibers prior to impregnation by the action of a vacuum.

As suitable ionizing radiation, it is proposed to use radiation in the spectrum ranging from 300 nm to 450 nm designated hereinafter, as is conventional, as the ultraviolet-visible spectrum. It should be noted in passing that the degree of desired polymerization is achieved for example by adjusting the time of exposure to the ultraviolet-visible radiation (conveying speed, length of polymerization device).

In a particular embodiment, it is proposed experimentally to control the degree of polymerization by means of an analysis of the Shore D hardness of the composition. The Shore hardness values given below are measured using a Shore D hardness tester as described by French standard NF T 46-052. If the aim is to achieve Shore D hardness values of the order of 90 to 95 for the final composite, exposure to ionizing radiation is preferably stopped for example once the Shore D hardness of the stabilized pre-preg composition is greater than 45 and before the Shore D hardness of the stabilized pre-preg composition exceeds 65. More generally, it is proposed that the stage of exposure to ionizing radiation be stopped once the index D comprising the Shore D hardness of the stabilized pre-preg composition divided by the Shore D hardness of the final composite composition has reached a value of the order of 0.5 and before said index D has reached a value of the order of 0.7.

It is also possible experimentally to control the degree of polymerization by means of an analysis of the glass transition temperature $T_g$ of the composition. A rule of good practice is proposed, according to which, on the basis of the index $T=T_{gf}-T_{gpr}$, with $T_{gpr}$ being the glass transition temperature of the stabilized pre-preg composition and $T_{gf}$ being the glass transition temperature of the final composite composition, exposure to ionizing radiation is stopped once the index T has fallen below 120° C. and before said index T has fallen below 30° C. For example, where the glass transition temperature $T_g$ of the final composite composition is of the order of 160° C., exposure to ionizing radiation is stopped once the glass transition temperature $T_g$ of the stabilized pre-preg composition has reached a value of the order of 40° C. and before the glass transition temperature $T_g$ of the stabilized pre-preg composition has reached a value of the order of 130° C.

The stabilization stage is preferably performed in an inert atmosphere. Afterwards, various options are possible. It is possible to envisage continuing the stabilization stage until the resin is completely polymerized. After the stabilization stage, it is also possible to subject the stabilized pre-preg to heat treatment, during which the temperature thereof is raised, preferably to a temperature higher than the final glass transition temperature $T_g$ of the composition. By way of example, a suitable treatment temperature is of the order of 150° C. at least. The final properties of the material are not due solely or even principally to stabilization. They are also to a considerable extent the result of the additional heat treatment.

Due to the fact that control of the degree of polymerization, during the initiation stage of polymerization of the resin, is not performed thermally, it is possible to adjust the viscosity of the composition during the stage of fiber impregnation by a moderate increase in the temperature of said composition. For example, it is possible to raise the temperature to approximately 80° C., without any substantial effect on the stability of the resin. This allows much better impregnation of the fibers. There is thus available an impregnation phase control parameter which is independent of the parameters of the subsequent stages of the process.

As far as suitable resins are concerned, it should be mentioned by way of example that the resin may be selected from the group comprising vinyl ester resins and unsaturated polyester resins, or indeed be an epoxy resin.

As far as the reinforcement fibers are concerned, it should be mentioned that these may be selected from among organic fibers, such as high-tenacity polyacrylic fibers or oxidized polyacrylonitrile fibers, high-tenacity polyvinyl alcohol fibers, aromatic polyamide fibers or polyamide-imide fibers or polyimide fibers, chlorofibers, high-tenacity polyester fibers or aromatic polyester fibers, high-tenacity polyethylene fibers, high-tenacity polypropylene fibers, cellulose or rayon or high-tenacity viscose fibers, polyphenylene benzobisoxazole fibers or polyethylene naphthenate fibers, or they may be selected from among inorganic fibers such as glass fibers, carbon fibers, silica fibers or ceramic (alumina, aluminosilicate, borosilicoaluminate) fibers. The process preferably uses unidirectional fibers parallel to said at least one preferential reinforcement direction, disposed substantially in parallel during impregnation with said composition.

The composition preferably comprises a polymerization photoinitiator and the radiation is within the ultraviolet-visible spectrum. In this case, a glass fiber is preferably used. Partial polymerization of the composition is performed by exposure for a suitable period to ultraviolet-visible radiation (Philips UV tube TLK 40W/03). The pre-preg has proven to be sufficiently radiation-transparent for polymerization to be thoroughly homogeneous.

As a variant of or in addition to that which has been stated above in relation to the viscosity of the composition, it is also possible to adjust said viscosity by a monomer copolymerizable with the resin added to the composition and of which the proportion may be varied. For example, the monomer whose proportion may be varied is styrene. A suitable photoinitiator is the oxide of bis(2,4,6-trimethylbenzoyl)phenyl phosphine (photoinitiator Irgacure 819).

According to another particular aspect, the invention relates to a process of firmly connecting a composite material to rubber. To this end, a layer of resorcinol/formaldehyde latex (RFL) adhesive is preferably applied to the surface of the elongate composite element. In a particular application, said layer of RFL adhesive may be dried without reaching a temperature above 100° C., that is to say without high temperature heat treatment, before it receives said layer of rubber. During final molding, for example after incorporation of the elongate composite element into a rubber matrix as a reinforcement, a good connection is achieved between the elongate composite element and the rubber. The use of a non-polymerized RFL adhesive renders it unnecessary to have recourse to special elastomers for adhesion of the rubber to the composite material.

The invention also proposes an installation for manufacturing an elongate composite element in undefined lengths but of predetermined final cross section, said composite element containing reinforcement fibers forming a predetermined total fiber cross section smaller than said final cross section, said fibers being embedded in a matrix based on a composition containing a curable resin, the installation comprising:

a vacuum chamber;

rigid-walled inlet tubing, having an inlet orifice and a downstream orifice opening into the vacuum chamber, the tubing having a minimum cross section greater than the total fiber cross section, the length of the tubing measured between the inlet orifice and the downstream orifice being very considerable in relation to said minimum cross section;

an impregnation chamber:

rigid-walled transfer tubing between the vacuum chamber and the impregnation chamber, having an inlet orifice communicating with the vacuum chamber and a downstream orifice opening into the impregnation chamber, the transfer tubing having a minimum cross section greater than the total fiber cross section, the length of the transfer tubing measured between the inlet orifice and the downstream orifice being very considerable in relation to said minimum cross section;

a sizing die for the elongate composite element, downstream of the sizing die, means of at least prepolymerizing the resin.

The invention allows effective and continuous impregnation of the arrangement of fibers, in particular by prior vacuum treatment. Previously, use of a vacuum created tightness problems, such that it was used in practice only for the manufacture of components by means of a mold, that is to say one after the other and not continuously. Vacuum treatment was typically performed by means of a sealed chamber, into which the group of fibers to be impregnated had been previously introduced.

The use of rigid-walled tubing, for both the inlet orifice into the vacuum chamber and the outlet orifice from the vacuum chamber and for transfer from the vacuum chamber to the impregnation chamber, has proved compatible with high rates of passage of the fibers through the orifices without fiber breakage while allowing satisfactory levels of tightness. It is sufficient, if necessary experimentally, to determine the largest passage cross section, taking into account the total cross section of the fibers to be treated, which still allows sufficient tightness to be achieved, taking account of the speed of feed of the fibers and the length of the tubing. A large length promotes tightness.

Advantageously, at least one of the tubings has a cross section which does not increase, but rather preferably converges, as it travels from the inlet orifice towards the downstream orifice. This offers a good compromise between minimum friction of the fibers against the walls and good tightness. Of course, the tightness of the tubing in question is only relative. From the perspective of dynamic operation, this means that the leakage of air towards the vacuum chamber is low relative to the air evacuation capacity of the vacuum pump used. In practice, resin leakage towards the vacuum chamber is zero, given the viscosity of the resin, the pressure differential between the vacuum chamber and the impregnation chamber, the cross section and length of the passage between the vacuum chamber and the impregnation chamber and given the rate of feed of the fibers, which creates the effect of the resin returning towards the impregnation chamber.

Two examples of implementation of the process according to the invention will now be described with reference to the attached drawings, which illustrate schematically various variant embodiments of a treatment installation according to the invention.

DESCRIPTION OF THE DRAWINGS

FIG. 4 is a sectional view of a second embodiment of an apparatus according to the invention;

FIG. 5 is another sectional view, through a section plane perpendicular to the section plane of FIG. 4, of the same second embodiment of an apparatus according to the invention;

DESCRIPTION OF PREFERRED EMBODIMENTS

Figure 1:
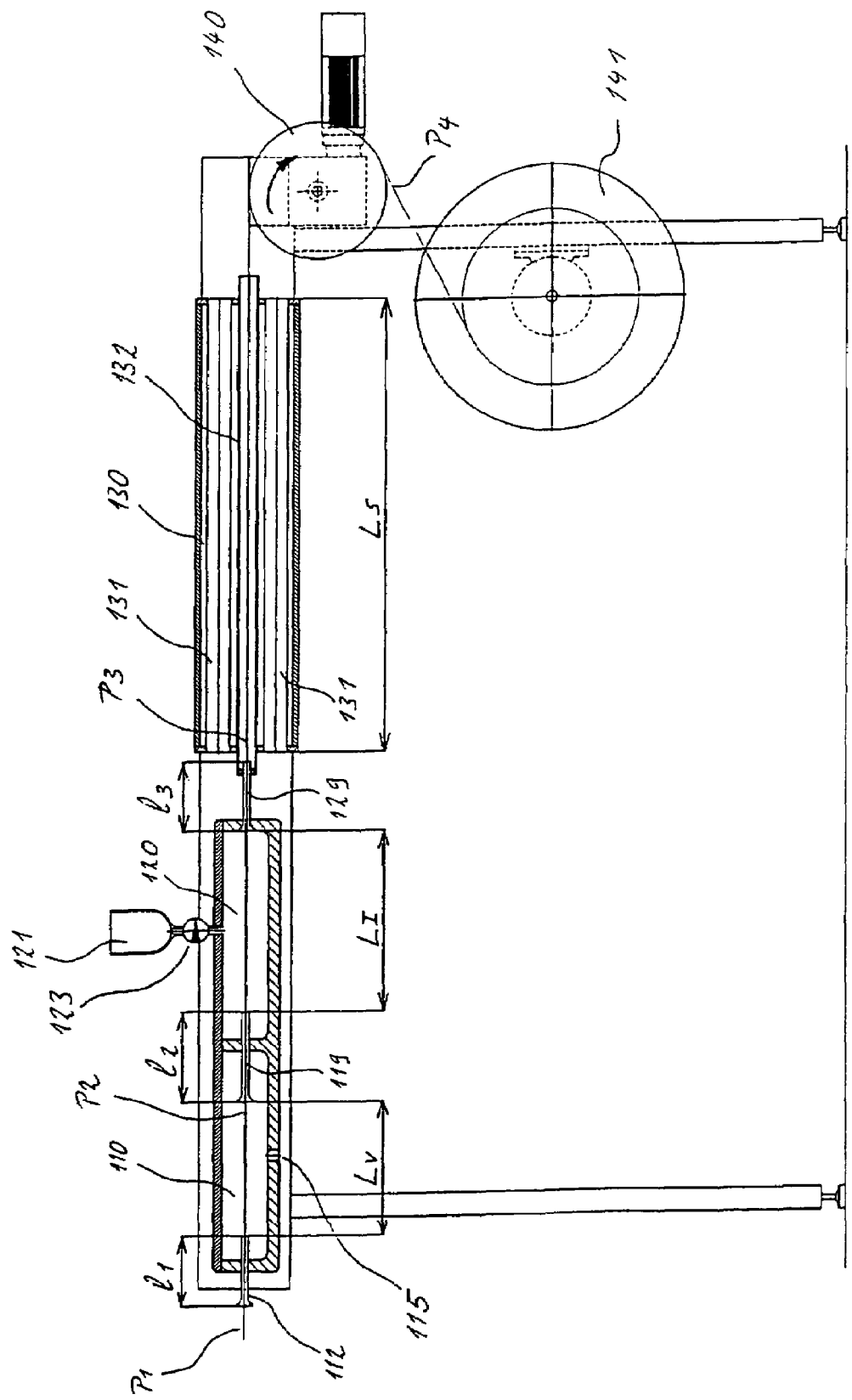
FIG. 1 is a schematic representation of a first embodiment of an apparatus according to the invention.
Figure 2:
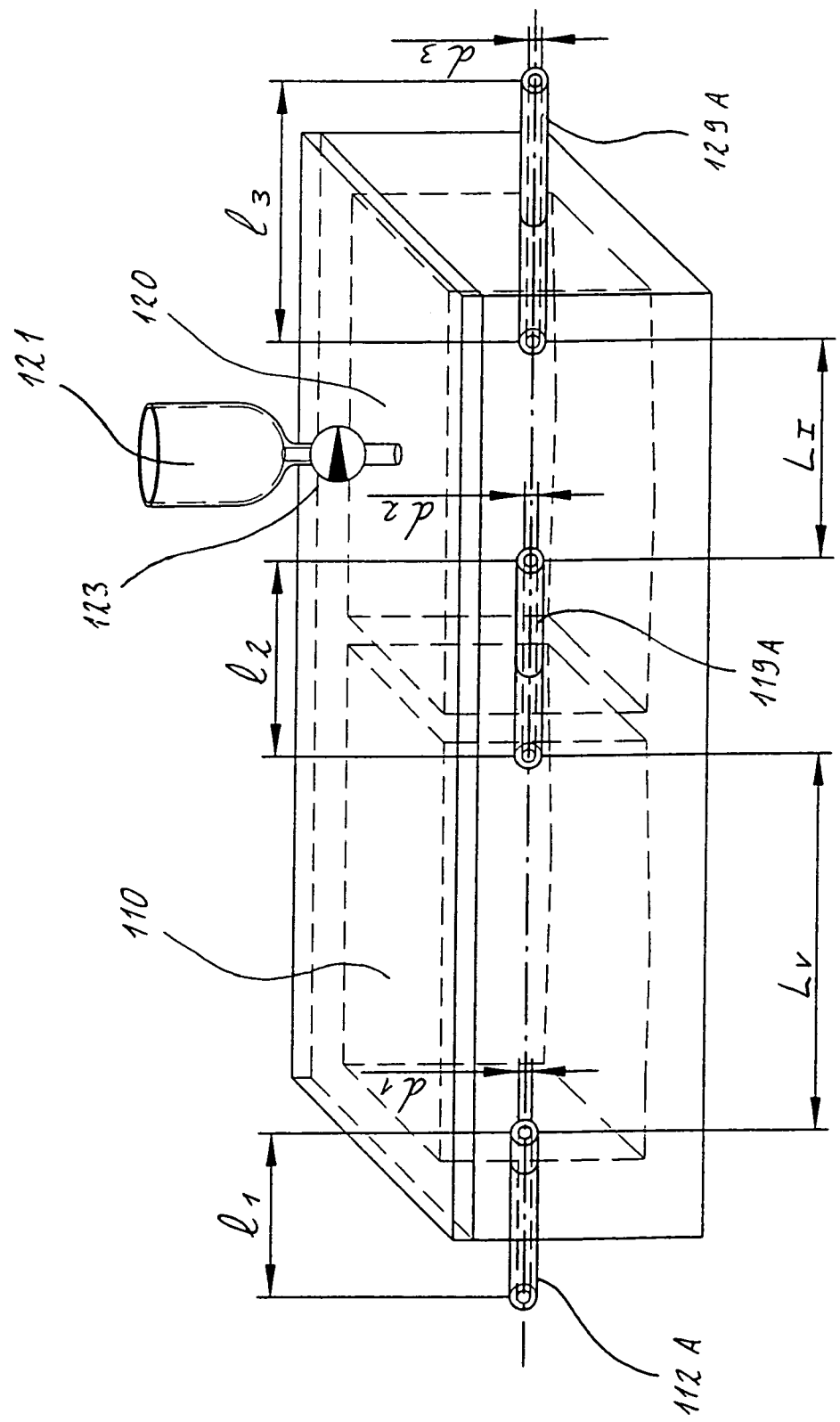
FIG. 2 is an enlarged view of part of the apparatus according to the first embodiment of the invention.
Figure 3:
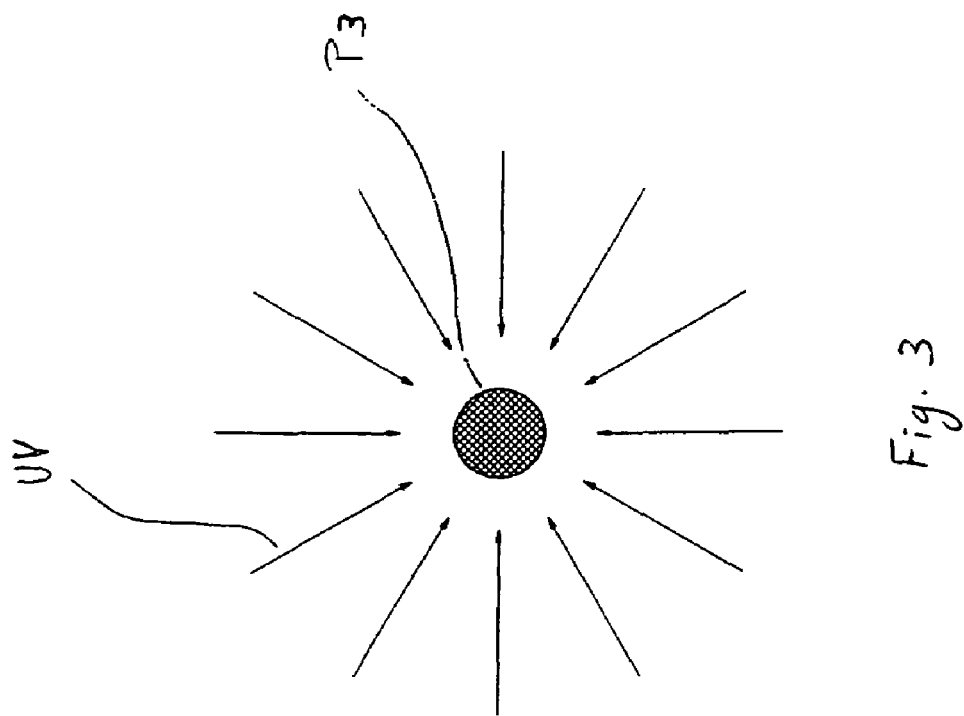
FIG. 3 is a schematic representation of a another part of the apparatus according to the first embodiment of the invention.
Figure 7:
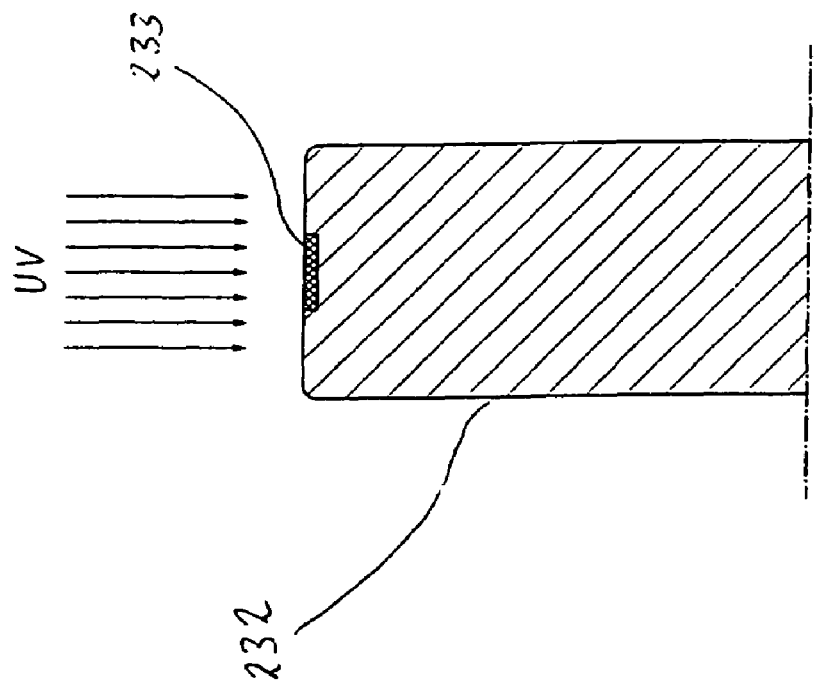
FIG. 7 is a schematic representation of another part of the second embodiment of an apparatus according to the invention.

The invention lends itself to a wide range of shapes for the cross section of the composite material produced, comprising suitable fibers embedded in the selected resin. FIGS. 1 to 3 illustrate an installation which is more particularly suited to manufacture of an elongate composite element of round cross section. FIG. 1 shows the fibers P1 being continuously unwound from a reel. In general, the reinforcement fibers are supplied in rovings, that is to say in groups of fibers wound in parallel on a reel (for example, fibers, also known as filaments, are used which are sold under the name PPG 2001-300 TEX).

For example, the composite material exits in the form of a filament P4 of round cross section of any size, drawn by a winding device comprising a roller 140 and a receiving reel 141. The traction exerted by the roller 140 is what allows feed of the fibers in parallel along the installation.

FIG. 1 reveals in succession a vacuum chamber 110, an impregnation chamber 120 and a stabilization chamber 130. The fibers P1 are introduced into the vacuum chamber 110 via rigid-walled inlet tubing 112. The vacuum chamber is connected to a vacuum pump (not shown) via the orifice 115. The function of the inlet tubing 112 is to ensure continuous tightness at high speed. Although the theoretical passage cross section of the inlet tubing 112 is far greater than the total combined cross section of all the fibers drawn by the roller 140, it has been noted that sufficient tightness was reached for pressure levels of the order of 0.1 bar (absolute pressure), while the cross section of the inlet tubing 112 is of the order of twice the combined cross section of the fibers to be impregnated. The "combined cross section" is the sum of the individual cross section of each of the fibers. The length of the inlet tubing $l_1$ is preferably more than 30 times the minimum dimension $d_1$ of the smallest cross section of the inlet tubing.

Another possible function of the inlet tubing 112 is to prepare the arrangement of fibers in accordance with the shape of the composite to be manufactured. For example, a hollow needle 112A (of circular cross section, see FIG. 2), is used.

It is desirable for the size of the cross section of the tubing not to be determined independently of the length of the tubing. The greater is the length of the inlet tubing $l_1$, the easier it is to ensure dynamic vacuum tightness. In practice, sufficient tightness is deemed to have been reached when the leakage rate of the air which, in spite of everything, may pass from the atmosphere towards the inside of the vacuum chamber is very much less than the capacity of the vacuum pump. The greater is the length of the inlet tubing, the more tolerable is a large minimum inlet tubing cross section relative to the cross section of the fibers unwound through the installation.

As explained above with regard to the inlet tubing, the transfer tubing may also be a hollow needle of circular cross section (see 119A in FIG. 2).

This is followed by the impregnation chamber 120, which, in the example described here, is a tight enclosure supplied with resin via an external tank 121 by means of a pipe. A metering pump 123 is preferably inserted into said pipe. It is thus possible to know very precisely the amount of impregnation resin used. The tight impregnation chamber 120 is totally filled with resin. The fibers pass from the vacuum chamber to the impregnation chamber via the transfer tubing 119 of the length $l_2$. The arrangement of fibers P2 advancing through the inside of the transfer tubing 119 has undergone vacuum treatment. The arrangement of fibers is thus in a state in which its propensity to absorb resin is very considerable.

The role of the transfer tubing 119 is also to ensure tightness between the vacuum and the resin filling the impregnation chamber. As far as the transfer tubing is concerned, it has been noted it is sufficient for the length $l_2$ to be more than 40 times the minimum dimension $d_2$ of the minimum cross section with a tubing cross section of the order of twice the combined cross section of the fibers to be impregnated.

Downstream of the impregnation chamber is a sizing die 129. The role of the sizing die is to shape the pre-preg P3 before polymerization of the resin is begun. In addition to shaping, it is suitable for ensuring considerable dimensional precision of the end product. For example, the sizing die is of circular cross section (see 129A in FIG. 2), the length $l_3$ of the die being more than 50 times the smallest dimension $d_3$ of the minimum cross section.

The sizing die 129 or 129B may play a part in metering of the proportion of fiber relative to resin. The proportion of fiber relative to resin depends on the minimum passage cross section through the sizing die relative to the total cross section of the fibers being unwound in parallel through the installation. It will be seen that it is also possible to control metering by means of a positive displacement pump.

The pre-preg sizing die 129 or 129B is followed by a stabilization chamber 130. The impregnating resin is relatively fluid at ambient temperature and has no mechanical stability of its own. It is therefore necessary to convert it into the solid phase, so as to be able to handle the elongate composite element, if only for storage. Polymerization of the resin may be initiated by one of the known methods, for example thermal initiation, or, as in this example of implementation, by ionizing radiation, for example ultraviolet radiation.

Thus, the stabilization chamber of the installation comprises a device allowing exposure of the composition containing said fibers to ionizing radiation, to initiate polymerization of the resin and obtain a stabilized pre-preg in which said composition is substantially in the solid phase.

Said stabilization chamber advantageously comprises a tight tube 132, which comprises a wall which is at least partially transparent to said ionizing radiation. The pre-preg stabilization stage proceeds when the pre-preg P3 is completely out of contact with any support (see FIG. 3). A radiation source is disposed outside the tight tube 132, in such a way as to be able to expose said composition of the pre-preg P3 to UV radiation in the absence of oxygen. Irradiation tubes 131, for example Philips TLK 40W/03 UV tubes which provide radiation in the ultraviolet-visible spectrum, are shown positioned around the tight tube 132.

The installation is very well suited to high treatment rates. The higher is the rate, the more expedient it is for the length of the various treatment zones, i.e. the length $L_V$ of the vacuum chamber 110, the length $L_I$ of the impregnation chamber 120 and the length $L_S$ of the stabilization chamber to be considerable.

Figure 6:
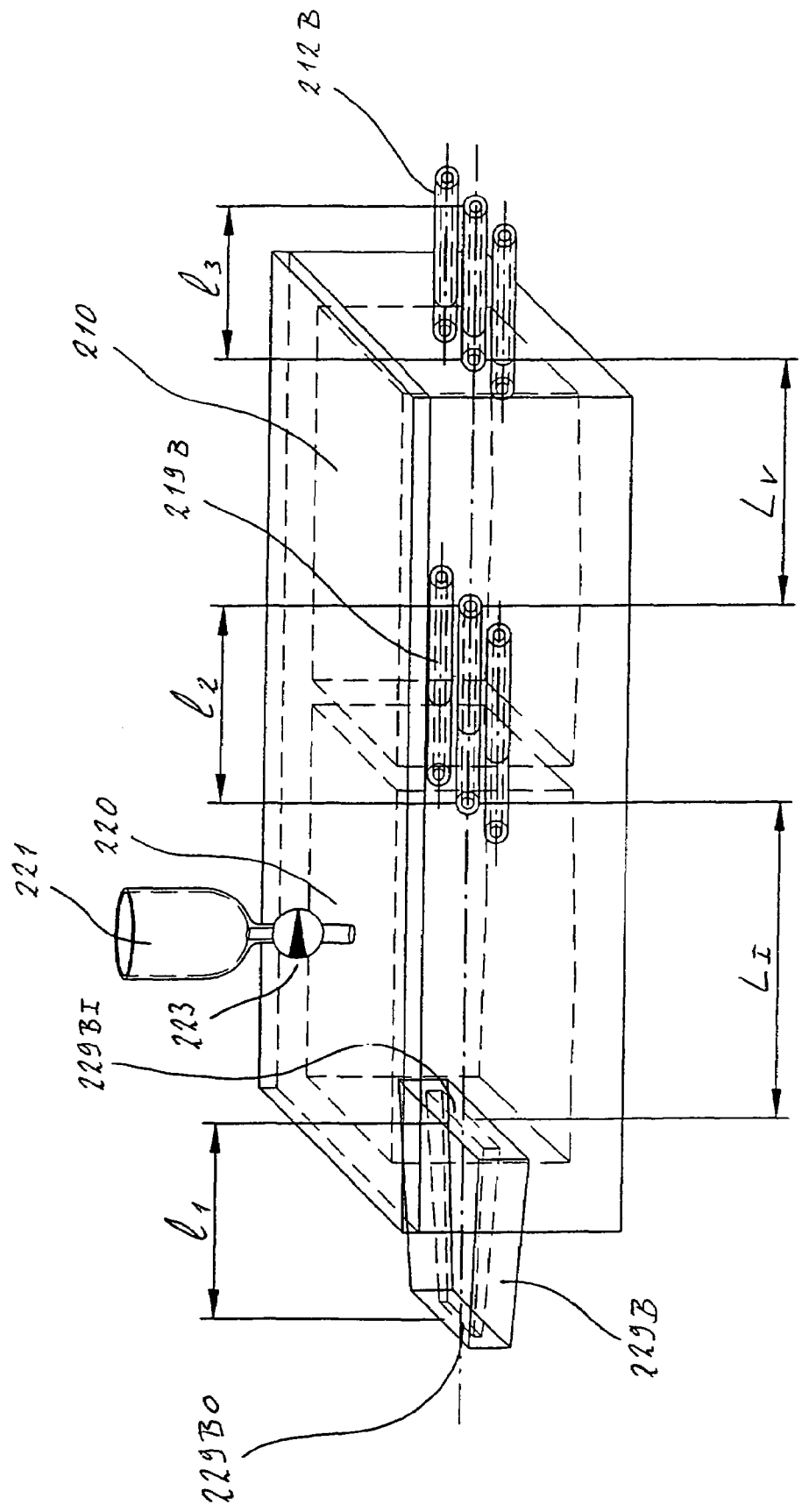
FIG. 6 is an enlarged view of part of the apparatus according to the second embodiment of the invention.

FIGS. 4 to 7 show an installation producing a tape R4 with a cross section 0.2 mm by 5 mm. The Figures show inlet tubing 212, a vacuum chamber 210, transfer tubing 219, an impregnation chamber 220, a resin tank 221 and a metering pump 223, a sizing die 229 and a stabilization chamber 230. The sizing die is of rectangular cross section, the length of the die being more than 100 times the minimum dimension of the minimum cross section. FIG. 6 shows a sizing die 229B of rectangular cross section, which may vary between the inlet 229BI and the outlet 229BO. The upstream orifice of said die has a cross section of 10 mm×0.5 mm, for example. The intermediate cross sections may be of varying proportions, while their surface area diminishes at least in part of the sizing die. In the example selected, the outlet cross section does not correspond exactly to the cross section of the tape produced, i.e., by way of reminder, 5 mm×0.2 mm. The dimensions of the downstream orifice of the sizing die may be slightly greater (for example 5.3 mm×0.25 mm).

The inlet tubing also has the function of ensuring initial shaping of the composite to be produced. It has also to distribute as homogeneously as possible the entirety of the fibers over the entirety of the passage cross section provided by the inlet tubing. It is proposed to ensure homogeneous distribution by multiplying the number of guides within the inlet tubing. For example, the latter is formed by an arrangement of hollow needles 212B, of circular cross section and disposed in parallel (see FIG. 6).

In the second variant, the pre-preg stabilization stage proceeds when the pre-preg is in constant contact with a support (without relative slip). The fibers P1 are introduced into the vacuum chamber 210 via rigid-walled inlet tubing 212. The vacuum chamber is connected to a vacuum pump (not shown). Apart from the stabilization chamber, the installation is very similar and there is therefore no point in going over these aspects in detail again.

The stabilization chamber 230 comprises a mobile rim 232, at the periphery of which there is formed a support surface 233 (see FIG. 7) partially defining said predetermined final cross section of the elongate composite element. For example, to produce a tape of rectangular cross section, a groove is preferably formed in the periphery of the rim 232, the faces of said groove forming the support surface. The support surface 233 is capable of rotating. The pre-preg is thus supported without slip during stabilization treatment. The stabilization chamber 230 includes the vacuum chamber 210 and the impregnation chamber 220. Through this arrangement, it is easy to install the pre-preg leaving the sizing orifice 229 on a support, while protecting it from oxidation. An inert (nitrogen) atmosphere may be provided, for example. Irradiation tubes 231, for example Philips TLK 40W/03 UV tubes which provide radiation in the ultraviolet-visible spectrum, are shown positioned around the rim 232. Thus, the stabilization chamber of the installation comprises a device allowing exposure of the composition containing said fibers in a thin layer to ionizing radiation, to initiate polymerization of the resin and obtain a stabilized pre-preg in which said composition is substantially in the solid phase.

The above-described installations offer the possibility of manufacturing long reinforcements of any cross section, either in the finished composite state (complete polymerization of the resin) or in the stabilized pre-preg state (i.e. polymerization of the resin is not complete but has proceeded to a sufficient degree for at least the outer surfaces of the product to be in the solid phase, making handling of the product possible to a reasonable degree without destroying it). It is possible to produce tapes of rectangular cross section, as explained above. It is also possible to produce filaments, for example of round cross section, which may for example serve as monofilament-type reinforcements for rubber tires.

The above-described installations allow very fast rates of manufacture, while attaining and maintaining relatively high levels of vacuum in the vacuum chamber, guaranteeing very good impregnation of the fibers by the resin. This is achieved with a negligible fiber breakage rate. The cross sections of the inlet and transfer tubing are all substantially larger than the total cross section of the fibers. There is very little friction between the fibers and the walls but, despite that, sufficient lightness is achieved between the atmosphere and the various chambers and between the chambers themselves. Changing the dimensions and/or cross sections of the products produced is very simple, as it is merely necessary to replace the inlet and transfer tubing and the sizing die. These elements have thus been designed so as to be easily exchanged.

The process according to the invention allows treatment conditions to be maintained from inlet of the fibers until the pre-preg is produced, without either the fibers or the assembly formed by the fibers and the impregnation composition coming into contact with the ambient atmosphere until the pre-preg has become sufficiently stable. For example, one or more enclosures allow said arrangement to be kept isolated from the atmosphere, dynamically speaking. This allows the treatment parameters to be maintained in a controlled manner. Furthermore, the use of separate treatment enclosures for degassing and impregnation, if both operations are provided, has the advantage of allowing mutually independent control of said operations.

Finally, there are several simple ways of influencing the proportion of fibers relative to the resin. The role of substantially determining the final shape of the elongate composite element is preferably reserved for the passage cross section. Although the passage cross section is not unrelated to the proportion of fibers, influencing the proportion of fibers relative to the resin is preferably achieved using a positive displacement metering pump. By varying the rate of resin injection into the impregnation chamber, it is possible, at a constant conveying speed for the fibers unwound in parallel, to vary somewhat the proportion of resin relative to the fibers by forcing the resin to exit to a greater or lesser extent via the sizing die. The invention provides the possibility of manufacturing a composite or stabilized pre-preg in very small cross sections, virtually without lower limit.

The surface area of the combined cross section of the fibers of said arrangement is preferably less than 80% of the surface area of the cross section of said die, in order not to crush the fibers and in order to treat correctly the assembly comprising the fibers and the impregnating resin. The proposed process in particular allows preparation of a pre-preg in which the surface area of the combined cross section of the fibers of said arrangement and the surface area of the resin cross section are substantially the same. The installation according to the invention is preferably such that the surface area of the cross section of the inlet tubing and the surface area of the cross section of the sizing die differ advantageously by less than 20%.

All conventional reinforcement fibers may be used in such an installation, in particular glass or carbon fibers. In the example described, glass fibers are used. Of course, the resin used may also comprise a certain number of additives, which may or may not participate in the gelling and polymerization reactions, such as thermoplastic resins, plasticizers, anti-shrinkage agents, internal mold release agents, colorants etc. This elongate composite element manufacturing process allows the achievement of very high fiber contents by volume, of up to 50%.

We claim:

1. An apparatus for manufacturing an elongated composite element having a predetermined final cross section, said composite element containing reinforcement fibers forming a predetermined total fiber cross section smaller than said predetermined final cross section, said fibers being embedded in a matrix based on a composition containing a curable resin, the apparatus comprising:

a vacuum chamber;

a rigid-walled inlet tubing having an inlet orifice and a downstream orifice opening into the vacuum chamber, the inlet tubing having a minimum cross section greater than the predetermined total fiber cross section, the length of the inlet tubing measured between the inlet orifice and the downstream orifice being substantially larger than said minimum cross section of the inlet tubing;

an impregnation chamber;

a rigid-walled transfer tubing between the vacuum chamber and the impregnation chamber, the transfer tubing having an inlet orifice communicating with the vacuum chamber and a downstream orifice opening into the impregnation chamber, the transfer tubing having a minimum cross section greater than the total fiber cross section, the length of the transfer tubing measured between its inlet orifice and its downstream orifice being more than 40 times a minimum dimension of said minimum cross section of the transfer tubing;

a sizing die for the elongated composite element, and downstream of the sizing die, means for prepolymerizing the resin.

2. The apparatus according to claim 1, in which one of the inlet and transfer tubings has a cross section which does not increase from the inlet orifice towards the downstream orifice and along the length of said one of the inlet and transfer tubings.

3. The apparatus according to claim 1, in which the length of the inlet tubing is more than 30 times a minimum dimension of the minimum cross section of the inlet tubing.

4. The apparatus according to claim 1, in which the sizing die has a circular cross section, the length of the sizing die being more than 50 times a diameter of the minimum cross section.

5. The apparatus according to claim 1, in which the sizing die has a rectangular cross section, the length of the die being more than 100 times a minimum dimension of the minimum cross section.

6. The apparatus according to claim 1, in which the inlet tubing is formed by an arrangement of hollow needles, the hollow needles having a circular cross section and disposed in parallel.

7. The apparatus according to claim 1, in which the transfer tubing is formed by an arrangement of hollow needles, the hollow needles having a circular cross section and disposed in parallel.

8. The apparatus according to claim 1, in which the impregnation chamber is a tight enclosure supplied with resin via an external tank by means of a pipe.

9. The apparatus according to claim 8 further comprising a resin metering pump inserted into said pipe.

10. The apparatus according to claim 1, in which said means for performing prepolymerization comprises a stabilization chamber.

11. The apparatus according to claim 10, in which said stabilization chamber comprises a device allowing exposure of the composition containing said reinforcement fibers in a layer arrangement to ionizing radiation, to initiate polymerization of the resin and obtain a composition substantially in a solid phase.

12. The apparatus according to claim 11, in which provision is made to expose said composition in an inert atmosphere.

13. The apparatus according to claim 11, in which said device comprises irradiation tubes for providing radiation in the ultraviolet-visible spectrum.

14. The apparatus according to claim 10, in which the stabilization chamber comprises a mobile rim, at a periphery of which there is formed a support surface partially defining said predetermined final cross section of the elongated composite element.

15. The apparatus according to claim 1, in which the surface area of the inlet tubing and the surface area of the sizing die differ by less than 20% of the surface area of the sizing die.

16. The apparatus according to claim 1, in which the surface area of the inlet tubing and the surface area of the sizing die differ by less than 20% of the surface area of the inlet tubing.

17. An apparatus for manufacturing an elongated composite element having a predetermined final cross section, said composite element containing reinforcement fibers forming a predetermined total fiber cross section smaller than said predetermined final cross section, said fibers being embedded in a matrix based on a composition containing a curable resin, the apparatus comprising:
a vacuum chamber;
a rigid-walled inlet tubing, having an inlet orifice and a downstream orifice opening into the vacuum chamber, the inlet tubing having a minimum cross section greater than the predetermined total fiber cross section, the length of the inlet tubing measured between its inlet orifice and the downstream orifice being more than 30 times a minimum dimension of said minimum cross section of the inlet tubing;
an impregnation chamber;
a rigid-walled transfer tubing between the vacuum chamber and the impregnation chamber, the transfer tubing having an inlet orifice communicating with the vacuum chamber and a downstream orifice opening into the impregnation chamber, the transfer tubing having a minimum cross section greater than the total fiber cross section;
a sizing die for the elongated composite element, and
downstream of the sizing die, means for prepolymerizing the resin.

18. The apparatus according to claim 17, in which one of the inlet and transfer tubings has a cross section which does not increase from the inlet orifice towards the downstream orifice and along the length of said one of the inlet and transfer tubings.

19. The apparatus according to claim 17, in which the length of the transfer tubing measured between its inlet orifice and its downstream orifice is more than 40 times a minimum dimension of said minimum cross section of the transfer tubing.

20. The apparatus according to claim 17, in which the sizing die has a circular cross section, the length of the sizing die being more than 50 times a diameter of the minimum cross section.

21. The apparatus according to claim 17, in which the sizing die has a rectangular cross section, the length of the die being more than 100 times a minimum dimension of the minimum cross section.

22. The apparatus according to claim 17, in which the inlet tubing is formed by an arrangement of hollow needles, the hollow needles having a circular cross section and disposed in parallel.

23. The apparatus according to claim 17, in which the transfer tubing is formed by an arrangement of hollow needles, the hollow needles having a circular cross section and disposed in parallel.

24. The apparatus according to claim 17, in which the impregnation chamber is a tight enclosure supplied with resin via an external tank by means of a pipe.

25. The apparatus according to claim 24 further comprising a resin metering pump inserted into said pipe.

26. The apparatus according to claim 17, in which said means for performing prepolymerization comprises a stabilization chamber.

27. The apparatus according to claim 26, in which said stabilization chamber comprises a device allowing exposure of the composition containing said reinforcement fibers in a layer arrangement to ionizing radiation, to initiate polymerization of the resin and obtain a composition substantially in a solid phase.

28. The apparatus according to claim 27, in which provision is made to expose said composition in an inert atmosphere.

29. The apparatus according to claim 27, in which said device comprises irradiation tubes for providing radiation in the ultraviolet-visible spectrum.

30. The apparatus according to claim 26, in which the stabilization chamber comprises a mobile rim, at a periphery of which there is formed a support surface partially defining said predetermined final cross section of the elongated composite element.

31. The apparatus according to claim 17, in which the surface area of the inlet tubing and the surface area of the sizing die differ by less than 20% of the surface area of the sizing die.

32. The apparatus according to claim 17, in which the surface area of the inlet tubing and the surface area of the sizing die differ by less than 20% of the surface area of the inlet tubing.

* * * * *